United States Patent
Karkhanis

(10) Patent No.: US 11,937,085 B2
(45) Date of Patent: Mar. 19, 2024

(54) METHODS, SYSTEMS, AND MEDIA FOR CREATING TEMPORARY VIRTUAL ACCESS POINTS USING WIFI ROUTERS WHEN PORTALS CANNOT BE PRESENTED

(71) Applicant: McAfee, LLC, Santa Clara, CA (US)

(72) Inventor: Sameer D. Karkhanis, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 60 days.

(21) Appl. No.: 16/540,826

(22) Filed: Aug. 14, 2019

(65) Prior Publication Data
US 2021/0051479 A1 Feb. 18, 2021

(51) Int. Cl.
| | |
|---|---|
| *H04W 12/08* | (2021.01) |
| *H04W 12/06* | (2021.01) |
| *H04W 12/062* | (2021.01) |
| *H04W 12/086* | (2021.01) |
| *H04W 48/20* | (2009.01) |
| *H04W 80/06* | (2009.01) |
| *H04W 84/12* | (2009.01) |

(52) U.S. Cl.
CPC ....... *H04W 12/086* (2021.01); *H04W 12/062* (2021.01); *H04W 48/20* (2013.01); *H04W 80/06* (2013.01); *H04W 84/12* (2013.01)

(58) Field of Classification Search
CPC ... H04W 12/086; H04W 84/12; H04W 12/06; H04W 80/06; H04W 48/20; H04W 12/062; H04L 63/08; H04L 2463/082
USPC .......................................................... 726/4
See application file for complete search history.

(56) References Cited

U.S. PATENT DOCUMENTS

| | | | |
|---|---|---|---|
| 9,131,431 B2 | 9/2015 | Lu | |
| 9,491,623 B2 | 11/2016 | Filippi et al. | |
| 10,313,491 B2* | 6/2019 | Baumgarte | H04W 12/50 |
| 10,601,832 B1* | 3/2020 | Pajjuri | H04L 63/08 |
| 11,171,786 B1* | 11/2021 | Voit | H04L 9/3247 |
| 2013/0166678 A1* | 6/2013 | Barak | H04L 67/303 |
| | | | 709/217 |
| 2014/0047510 A1* | 2/2014 | Belton | H04W 12/069 |
| | | | 726/4 |

(Continued)

FOREIGN PATENT DOCUMENTS

| | | |
|---|---|---|
| WO | WO 2005069784 | 8/2005 |
| WO | WO 2014049432 | 4/2014 |

OTHER PUBLICATIONS

International Search Report and Written Opinion dated Nov. 10, 2020 in International Patent Application No. PCT/US2020/043081, pp. 1-9.

*Primary Examiner* — Haresh N Patel
(74) *Attorney, Agent, or Firm* — Byrne Poh LLP

(57) ABSTRACT

Mechanisms (which can include systems, methods, and media) for securing WiFi routers and devices connected to them are provided. In some embodiments, mechanisms for securing a WiFi router comprise: receiving a first request to form a first connection between a first device and the WiFi router; determining whether a first portal can be presented in connection with the first device; and in response to determining that the first portal cannot be presented in connection with the first device: creating a first temporary virtual access point using the WiFi router; and connecting the first device to the WiFi router using the first temporary virtual access point.

20 Claims, 5 Drawing Sheets

(56) References Cited

U.S. PATENT DOCUMENTS

| | | | |
|---|---|---|---|
| 2015/0215832 A1* | 7/2015 | Fitzpatrick | H04W 48/18 |
| | | | 455/426.1 |
| 2015/0334579 A1 | 11/2015 | Lin et al. | |
| 2015/0382196 A1* | 12/2015 | Hillier | H04W 4/80 |
| | | | 726/7 |
| 2016/0073336 A1* | 3/2016 | Geller | H04W 72/085 |
| | | | 455/434 |
| 2017/0359319 A1* | 12/2017 | Kelsey | H04W 12/03 |
| 2018/0014242 A1* | 1/2018 | Furuta | H04W 48/20 |
| 2018/0020497 A1* | 1/2018 | Shirai | H04W 40/34 |
| 2018/0091506 A1* | 3/2018 | Chow | G06Q 20/085 |
| 2018/0189025 A1* | 7/2018 | Tanaka | H04S 7/30 |
| 2018/0317106 A1* | 11/2018 | Konstantinou | H04W 24/04 |
| 2018/0375760 A1* | 12/2018 | Saavedra | H04L 12/4633 |
| 2018/0376523 A1* | 12/2018 | Li | H04W 12/06 |
| 2019/0116504 A1* | 4/2019 | Rusackas | H04L 43/045 |
| 2019/0124540 A1* | 4/2019 | Inuganti | H04W 28/0215 |
| 2019/0191407 A1* | 6/2019 | Wang | H04W 36/00835 |
| 2019/0215796 A1* | 7/2019 | Poosamani | H04W 8/22 |
| 2019/0373525 A1* | 12/2019 | Singh | H04W 60/04 |
| 2020/0028700 A1* | 1/2020 | Zaks | H04L 12/06 |
| 2020/0037392 A1* | 1/2020 | Qui | H04L 67/22 |
| 2020/0351739 A1* | 11/2020 | Vaidya | H04W 36/26 |
| 2020/0382958 A1* | 12/2020 | Wang | H04B 10/1149 |
| 2021/0036927 A1* | 2/2021 | Mantri | H04L 41/12 |

* cited by examiner

METHODS, SYSTEMS, AND MEDIA FOR CREATING TEMPORARY VIRTUAL ACCESS POINTS USING WIFI ROUTERS WHEN PORTALS CANNOT BE PRESENTED

BACKGROUND

WiFi routers are ubiquitous in modern computer networks. These devices can be configured to connect a wide variety and large number of devices to a local area network (LAN) as well as a wide area network (such as the Internet). For example, devices can include user computers (e.g., laptop computers, tablet computers, desktop computers, etc.), mobile phones, media devices (e.g., streaming media players, televisions, audio-visual (AV) receivers), smart speakers, smart displays, smart appliances (e.g., smart refrigerators), internet protocol (IP) cameras, smart thermostats, other Internet of Things (IoT) devices, etc.

Many WiFi routers are unsecure due to users not changing the default passwords upon setting up the routers, or due to selecting weak passwords.

Moreover, many WiFi routers are unsecure because some devices connected to the routers are not isolated from other devices connected to the routers. For example, a compromised device that connects to a network, even temporarily, can infect other devices on the network with a virus.

Further, many WiFi routers are unsecure because guest networks provided by those networks do not change passwords required to connect to those networks frequently enough.

Accordingly, there is a need for new methods, systems, and media for securing WiFi routers and devices connected to them.

SUMMARY

In accordance with some embodiments, methods, systems, and media for securing WiFi routers and devices connected to them are provided.

In some embodiments, methods for securing a WiFi router are provided, the methods comprising: receiving a first request to form a first connection between a first device and the WiFi router; determining whether a first portal can be presented in connection with the first device; and in response to determining that the first portal cannot be presented in connection with the first device: creating a first temporary virtual access point using the WiFi router; and connecting the first device to the WiFi router using the first temporary virtual access point.

In some embodiments, the methods further comprise: receiving a second request to move the first connection from the first temporary virtual access point to a permanent virtual access point; receiving first credentials for a first user; performing secondary authentication for the first user; determining whether the first credentials and the secondary authentication indicate that the first user is authorized to move the first connection from the first temporary virtual access point to the permanent virtual access point; and in response to determining that the first credentials and the secondary authentication indicate that the first user is authorized to move the first connection from the first temporary virtual access point to the permanent virtual access point, moving the first connection from the first temporary virtual access point to the permanent virtual access point.

In some embodiments, the methods further comprise: receiving a third request to form a second connection between a second device and the WiFi router; determining whether a second portal can be presented in connection with the second device; in response to determining that the second portal can be presented in connection with the second device: causing the second portal to be presented; receiving a first user selection that the second connection is to be temporary; receiving second credentials for a second user; determining whether the second credentials indicate that the second user is authorized to connect the second device to the WiFi router using a second temporary virtual access point; and in response to determining that the second credentials indicate that the second user is authorized to connect the second device to the WiFi router using the second temporary virtual access point: connecting the second device to the WiFi router using the second temporary virtual access point. In some further embodiments, these methods further comprise: creating the second temporary virtual access point using the WiFi router in response to determining that the second credentials indicate that the second user is authorized to connect the second device to the WiFi router using the second temporary virtual access point.

In some further embodiments, these methods further comprise: receiving a fourth request to form a third connection between a third device and the WiFi router; determining whether a third portal can be presented in connection with the third device; in response to determining that the third portal can be presented in connection with the third device: causing the third portal to be presented; receiving a second user selection that the third connection is to be temporary; receiving third credentials for a third user; determining whether the third credentials indicate that the third user is authorized to connect the third device to the WiFi router using a third temporary virtual access point; and in response to determining that the third credentials indicate that the third user is authorized to connect the third device to the WiFi router using the third temporary virtual access point: connecting the third device to the WiFi router using the third temporary virtual access point.

In some embodiments, the methods further comprise: receiving a fifth request to form a fourth connection between a fourth device and the WiFi router; determining whether a fourth portal can be presented in connection with the fourth device; in response to determining that the fourth portal can be presented in connection with the fourth device: causing the fourth portal to be presented; receiving a third user selection that the fourth connection is to be permanent; receiving fourth credentials for a fourth user; determining whether the fourth credentials indicate that the fourth user is authorized to connect the fourth device to the WiFi router using a first permanent virtual access point; and in response to determining that the fourth credentials indicate that the fourth user is authorized to connect the fourth device to the WiFi router using the first permanent virtual access point: connecting the fourth device to the WiFi router using the first permanent virtual access point. In some further embodiments, these methods further comprise: creating the first permanent virtual access point using the WiFi router in response to determining that the fourth credentials indicate that the fourth user is authorized to connect the fourth device to the WiFi router using the first permanent virtual access point.

In some embodiments, the methods further comprise disconnecting the first device from the WiFi router using the first temporary virtual access point after a predetermined period since connecting the first device to the WiFi router using the first temporary virtual access point.

In some embodiments, systems for securing a WiFi router are provided, the systems comprising: a memory; and a hardware processor coupled to the memory and configured to: receive a first request to form a first connection between a first device and the WiFi router; determine whether a first portal can be presented in connection with the first device; in response to determining that the first portal cannot be presented in connection with the first device: create a first temporary virtual access point using the WiFi router; and connect the first device to the WiFi router using the first temporary virtual access point.

In some embodiments, the hardware processor is also configured to: receive a second request to move the first connection from the first temporary virtual access point to a permanent virtual access point; receive first credentials for a first user; perform secondary authentication for the first user; determine whether the first credentials and the secondary authentication indicate that the first user is authorized to move the first connection from the first temporary virtual access point to the permanent virtual access point; and in response to determining that the first credentials and the secondary authentication indicate that the first user is authorized to move the first connection from the first temporary virtual access point to the permanent virtual access point, move the first connection from the first temporary virtual access point to the permanent virtual access point.

In some embodiments, the hardware processor is also configured to: receive a third request to form a second connection between a second device and the WiFi router; determine whether a second portal can be presented in connection with the second device; in response to determining that the second portal can be presented in connection with the second device: cause the second portal to be presented; receive a first user selection that the second connection is to be temporary; receive second credentials for a second user; determine whether the second credentials indicate that the second user is authorized to connect the second device to the WiFi router using a second temporary virtual access point; and in response to determining that the second credentials indicate that the second user is authorized to connect the second device to the WiFi router using the second temporary virtual access point: connect the second device to the WiFi router using the second temporary virtual access point. In some embodiments, the hardware processor is further configured to: create the second temporary virtual access point using the WiFi router in response to determining that the second credentials indicate that the second user is authorized to connect the second device to the WiFi router using the second temporary virtual access point. In some embodiments, the hardware processor is further configured to: receive a fourth request to form a third connection between a third device and the WiFi router; determine whether a third portal can be presented in connection with the third device; in response to determining that the third portal can be presented in connection with the third device: cause the third portal to be presented; receive a second user selection that the third connection is to be temporary; receive third credentials for a third user; determine whether the third credentials indicate that the third user is authorized to connect the third device to the WiFi router using a third temporary virtual access point; and in response to determining that the third credentials indicate that the third user is authorized to connect the third device to the WiFi router using the third temporary virtual access point: connect the third device to the WiFi router using the third temporary virtual access point.

In some embodiments, the hardware processor is also configured to: receive a fifth request to form a fourth connection between a fourth device and the WiFi router; determine whether a fourth portal can be presented in connection with the fourth device; in response to determining that the fourth portal can be presented in connection with the fourth device: cause the fourth portal to be presented; receive a third user selection that the fourth connection is to be permanent; receive fourth credentials for a fourth user; determine whether the fourth credentials indicate that the fourth user is authorized to connect the fourth device to the WiFi router using a first permanent virtual access point; and in response to determining that the fourth credentials indicate that the fourth user is authorized to connect the fourth device to the WiFi router using the first permanent virtual access point: connect the fourth device to the WiFi router using the first permanent virtual access point. In some embodiments, the hardware processor is further configured to: create the first permanent virtual access point using the WiFi router in response to determining that the fourth credentials indicate that the fourth user is authorized to connect the fourth device to the WiFi router using the first permanent virtual access point.

In some embodiments, the hardware processor is also configured to disconnect the first device from the WiFi router using the first temporary virtual access point after a predetermined period since connecting the first device to the WiFi router using the first temporary virtual access point.

A non-transitory computer-readable medium containing computer executable instructions that, when executed by a processor, cause the processor to perform a method for securing a WiFi router, the method comprising: receiving a first request to form a first connection between a first device and the WiFi router; determining whether a first portal can be presented in connection with the first device; in response to determining that the first portal cannot be presented in connection with the first device: creating a first temporary virtual access point using the WiFi router; and connecting the first device to the WiFi router using the first temporary virtual access point.

In some embodiments of the non-transitory computer-readable media, the method further comprises: receiving a second request to move the first connection from the first temporary virtual access point to a permanent virtual access point; receiving first credentials for a first user; performing secondary authentication for the first user; determining whether the first credentials and the secondary authentication indicate that the first user is authorized to move the first connection from the first temporary virtual access point to the permanent virtual access point; and in response to determining that the first credentials and the secondary authentication indicate that the first user is authorized to move the first connection from the first temporary virtual access point to the permanent virtual access point, moving the first connection from the first temporary virtual access point to the permanent virtual access point.

In some embodiments of the non-transitory computer-readable media, the method further comprises: receiving a third request to form a second connection between a second device and the WiFi router; determining whether a second portal can be presented in connection with the second device; in response to determining that the second portal can be presented in connection with the second device: causing the second portal to be presented; receiving a first user selection that the second connection is to be temporary; receiving second credentials for a second user; determining whether the second credentials indicate that the second user is authorized to connect the second device to the WiFi router using a second temporary virtual access point; and in response to determining that the second credentials indicate that the second user is authorized to connect the second device to the WiFi router using the second temporary virtual access point: connecting the second device to the WiFi router using the second temporary virtual access point. In some further embodiments, the method further comprises: creating the second temporary virtual access point using the WiFi router in response to determining that the second credentials indicate that the second user is authorized to connect the second device to the WiFi router using the second temporary virtual access point. In some further embodiments, the method further comprises: receiving a fourth request to form a third connection between a third device and the WiFi router; determining whether a third portal can be presented in connection with the third device; in response to determining that the third portal can be presented in connection with the third device: causing the third portal to be presented; receiving a second user selection that the third connection is to be temporary; receiving third credentials for a third user; determining whether the third credentials indicate that the third user is authorized to connect the third device to the WiFi router using a third temporary virtual access point; and in response to determining that the third credentials indicate that the third user is authorized to connect the third device to the WiFi router using the third temporary virtual access point: connecting the third device to the WiFi router using the third temporary virtual access point.

In some embodiments of the non-transitory computer-readable media, the method further comprises: receiving a fifth request to form a fourth connection between a fourth device and the WiFi router; determining whether a fourth portal can be presented in connection with the fourth device; in response to determining that the fourth portal can be presented in connection with the fourth device: causing the fourth portal to be presented; receiving a third user selection that the fourth connection is to be permanent; receiving fourth credentials for a fourth user; determining whether the fourth credentials indicate that the fourth user is authorized to connect the fourth device to the WiFi router using a first permanent virtual access point; and in response to determining that the fourth credentials indicate that the fourth user is authorized to connect the fourth device to the WiFi router using the first permanent virtual access point: connecting the fourth device to the WiFi router using the first permanent virtual access point. In some further embodiments, the method further comprises: creating the first permanent virtual access point using the WiFi router in response to determining that the fourth credentials indicate that the fourth user is authorized to connect the fourth device to the WiFi router using the first permanent virtual access point.

In some embodiments of the non-transitory computer-readable media, the method further comprises disconnecting the first device from the WiFi router using the first temporary virtual access point after a predetermined period since connecting the first device to the WiFi router using the first temporary virtual access point.

DETAILED DESCRIPTION

Figure 1:
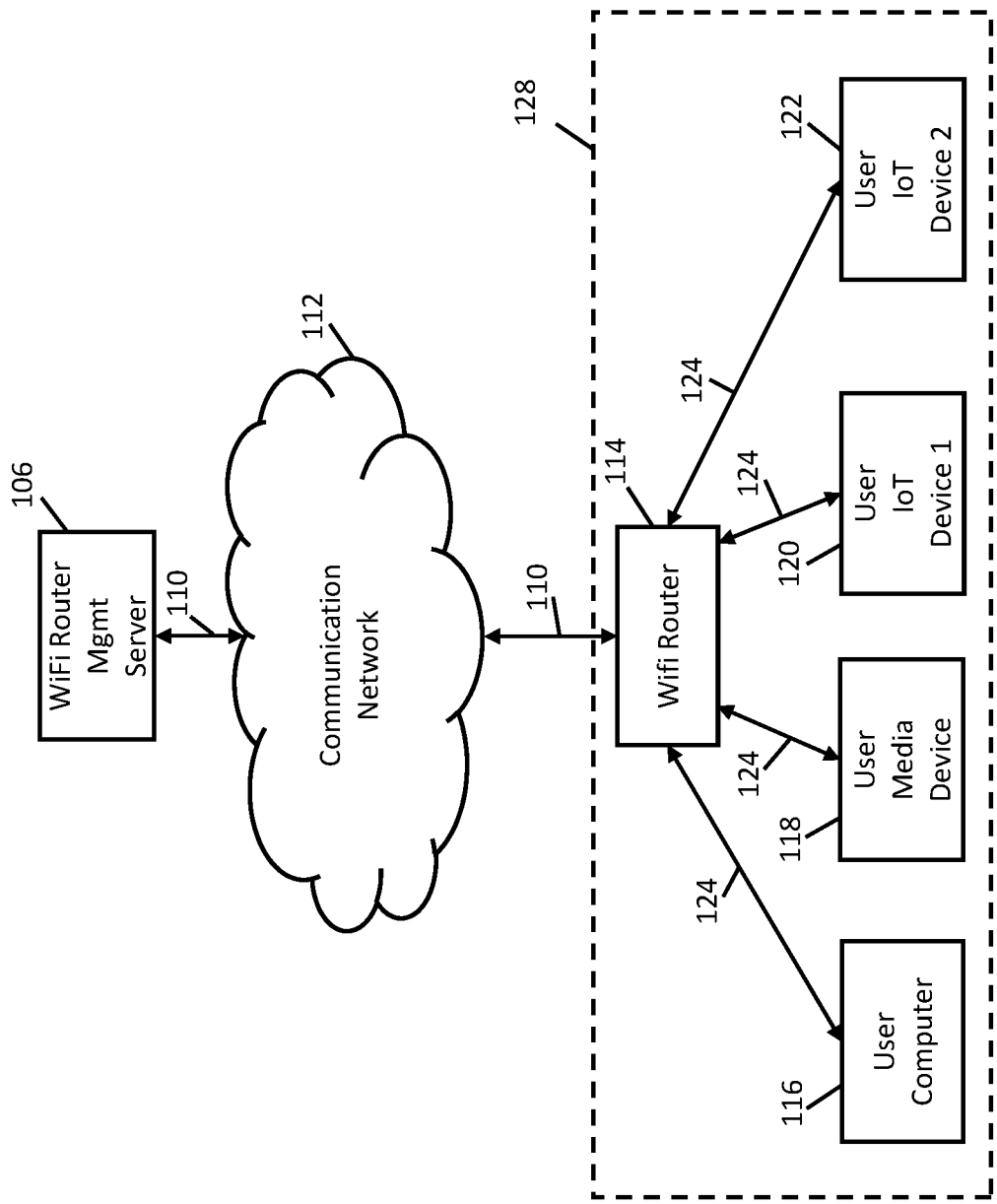
FIG. 1 illustrates an example of hardware that can be used in accordance with some embodiments.

In accordance with some embodiments, mechanisms (which can include methods, systems, and media) for securing WiFi routers and devices connected to them are provided.

In some embodiments, these mechanisms can create virtual access points (VAPs) and allow devices to connect to them based on certain factors. For example, in some embodiments, a master VAP can be created during set-up of a WiFi router and a user device used to set-up the router can be permanently able to connect to the master VAP. Such a master VAP can have no expiration point and can be used to connect highly trusted devices to each other and to a wide area network, such as the Internet, in some embodiments. As another example, in some embodiments, one or more temporary VAPs can be created as needed. Such a temporary VAP can have a predetermined expiration point (e.g., any suitable number of minutes, hours, days, weeks, months, etc.) and can be used to connect a device that is less trusted than those connected to the master VAP, or a device only requiring a temporary connection, to one or more similar devices or to a wide area network, such as the Internet, in some embodiments. In some embodiments, only a single device can connect to a temporary VAP, and in other embodiments, multiple devices can connect to the same temporary VAP. In some embodiments, devices connected to the same temporary VAP can communicate with each other, but they cannot connect to any device in any other temporary VAP or the master VAP. In some embodiments, other permanent VAPs, besides the master VAP, can be created, and like temporary VAPs, such other permanent VAPs can be limited (or not) to one device and can be isolated (or not) from other VAPs. In some embodiments, any device can be isolated from any wide area network (WAN), such as the Internet, using a VAP.

In order to connect to a VAP, a device can be required to provide security authentication, such as by providing user-entered credentials (e.g., user id and password) and by passing secondary authentication (e.g., provide a code sent to a predetermined mobile device). Depending on the level of security authentication achieved, the device can then be allowed to connect to a master VAP (or other permanent VAP if provided) or a temporary VAP. For example, to connect a device to a master VAP, a user may be required to provide proper credentials as well as pass secondary authentication. As another example, to connect to a temporary VAP, a user may be required to only provide user credentials or pass secondary authentication.

With some devices, it may not be possible to perform security authentication because the device is not capable of receiving user-entered credentials or performing secondary authentication. Such devices may be permitted to connect to a temporary VAP in which the device is isolated in some embodiments.

In some embodiments, a user can move a device's connection from one temporary VAP to another temporary VAP, to the master VAP, or to another permanent VAP. In order to do so, the user can be required to provide a suitable level of security authentication for the target VAP. For example, to move the device's connection to another temporary VAP, the user can be required to only provide user credentials or pass secondary authentication. As another example, to move the device's connection to the master VAP or another permanent VAP, the user can be required to provide user credentials and pass secondary authentication.

In some embodiments, a VAP (whether master, temporary, or other permanent) can restrict which one or more devices can access it using the devices' media access control (MAC) addresses. That is, only one or more devices having certain authorized MAC address(es) can connect to the VAP. In some embodiments, each device connecting to a VAP can be provided with a service set identifier (SSID) and password for the VAP. In some embodiments, the SSID and the password for each VAP can be different from the SSID and password used for each other VAP as well as a general SSID and password used for the WiFi router. Alternatively, in some embodiments, the SSID and password can be the same for each VAP as well as the general SSID and password for the WiFi router.

Turning to FIG. 1, an example 100 of hardware that can be used in accordance with some embodiments of the disclosed subject matter is shown. As illustrated, hardware 100 can include a WiFi router management server 106, a communication network 112, a WiFi router 114, a user computer 116, a user media device 118, and user Internet-of-Things (IoT) devices 120 and 122.

WiFi router management server 106 can be any suitable server for managing WiFi router(s). For example, in some embodiments, WiFi router management server 106 can be any server for managing WiFi router(s) and can perform any suitable functions, such as processes 300, 400, and 500 of FIGS. 3, 4, and 5. WiFi router management server 106 can be used to enable cloud based management of WiFi router(s) when desired.

Communication network 112 can be any suitable combination of one or more wired and/or wireless networks in some embodiments. For example, in some embodiments, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

WiFi router management server 106 and WiFi router 114 can be connected by one or more communications links 110 to communication network 112. The communications links can be any communications links suitable for communicating data among WiFi router management server 106, WiFi router 114, and communication network 112, such as network links, dial-up links, wireless links, hard-wired links, any other suitable communications links, or any suitable combination of such links.

WiFi router 114 can be any suitable WiFi router. For example, in some embodiments, WiFi router 114 can be any WiFi router for routing traffic between user computer 116, user media device 118, user Internet-of-Things (IoT) devices 120 and 122, and/or communication network 112, and can perform any suitable functions such as processes 300, 400, and 500 of FIGS. 3, 4, and 5.

User computer 116 can be any suitable computer, such as a desktop computer, a laptop computer, a tablet computer, a smart phone, and/or any other suitable computer device, and can perform any suitable functions.

User media device 118 can be any suitable device for streaming media, such as a media player box, a media player dongle (which can stream video and audio, video only, or audio only), a smart television, an audio-visual (AV) receiver, etc.

User IoT devices 120 and 122 can be any suitable Internet of Things devices, such as internet protocol (IP) cameras, smart smoke alarms, smart thermostats, smart locks, alarms, sensors, light bulbs, hubs, smart speakers, and/or any other device that can be connected to a computer network.

User computer 116, user media device 118, and user IoT devices 120 and 122 can be connected by one or more communications links 124 to WiFi router 114. The communications links can be any communications links suitable for communicating data among user computer 116, user media device 118, user IoT devices 120 and 122, WiFi router 114, such as network links, dial-up links, wireless links, hard-wired links, any other suitable communications links, or any suitable combination of such links.

In some embodiments, user computer 116, user media device 118, user IoT devices 120 and 122, communications links 124, and WiFi router 114 can form or be part of a local area network 128. As further described herein, any one or more of user computer 116, user media device 118, and user IoT devices 120 and 122 can be isolated from others of user computer 116, user media device 118, and user IoT devices 120 and 122 using the VAPs described herein.

Although one WiFi router management server 106, one WiFi router 114, one user computer 116, one user media device 118, and two user IoT devices 120 and 122 are shown in FIG. 1 to avoid over-complicating the figure, any suitable numbers (including zero for devices 106, 116, 118, 120, and 122 in some embodiments) of these devices can be used in some embodiments.

Figure 2:
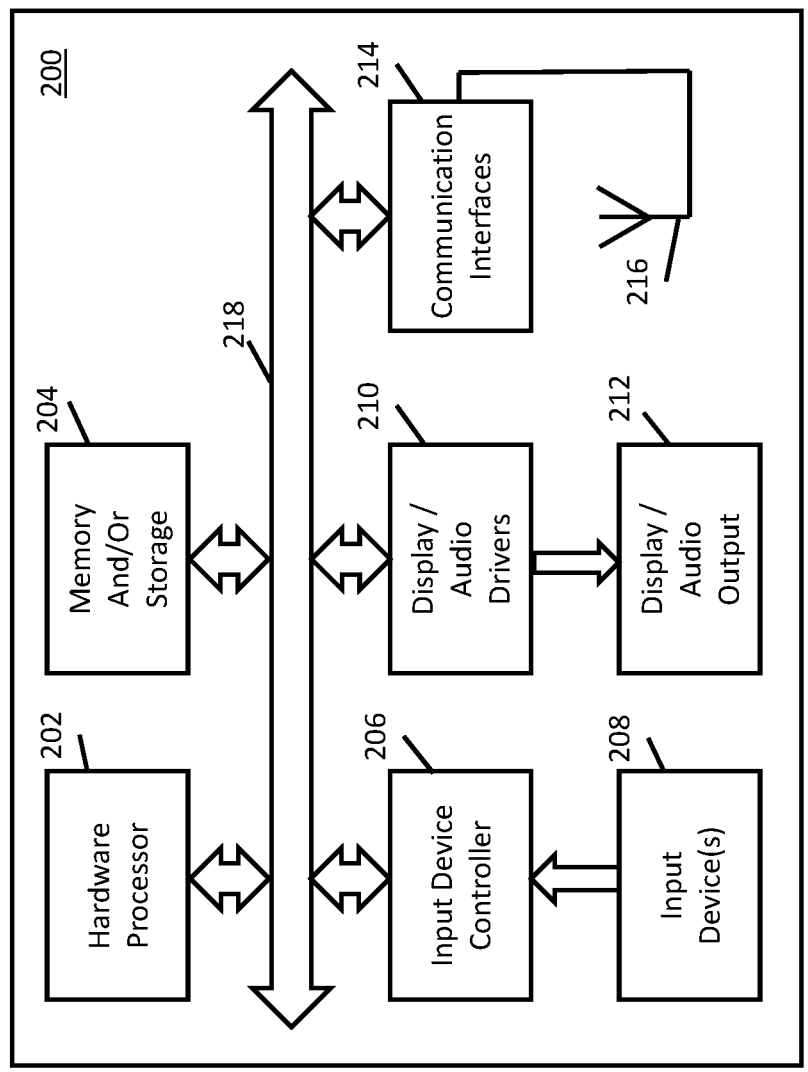
FIG. 2 illustrates a more particular example of hardware that can be used for certain components of the hardware of FIG. 1 in accordance with some embodiments.

WiFi router management server 106, WiFi router 114, user computer 116, user media device 118, and/or user IoT devices 120 and 122 can be implemented using any suitable hardware in some embodiments. For example, in some embodiments, WiFi router management server 106, WiFi router 114, user computer 116, user media device 118, and/or user IoT devices 120 and 122 can be implemented using any suitable general-purpose computer or special-purpose computer. For example, a WiFi router can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from input device(s) 208 in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving one or more display/audio output circuitries 212, such as an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Figure 3:
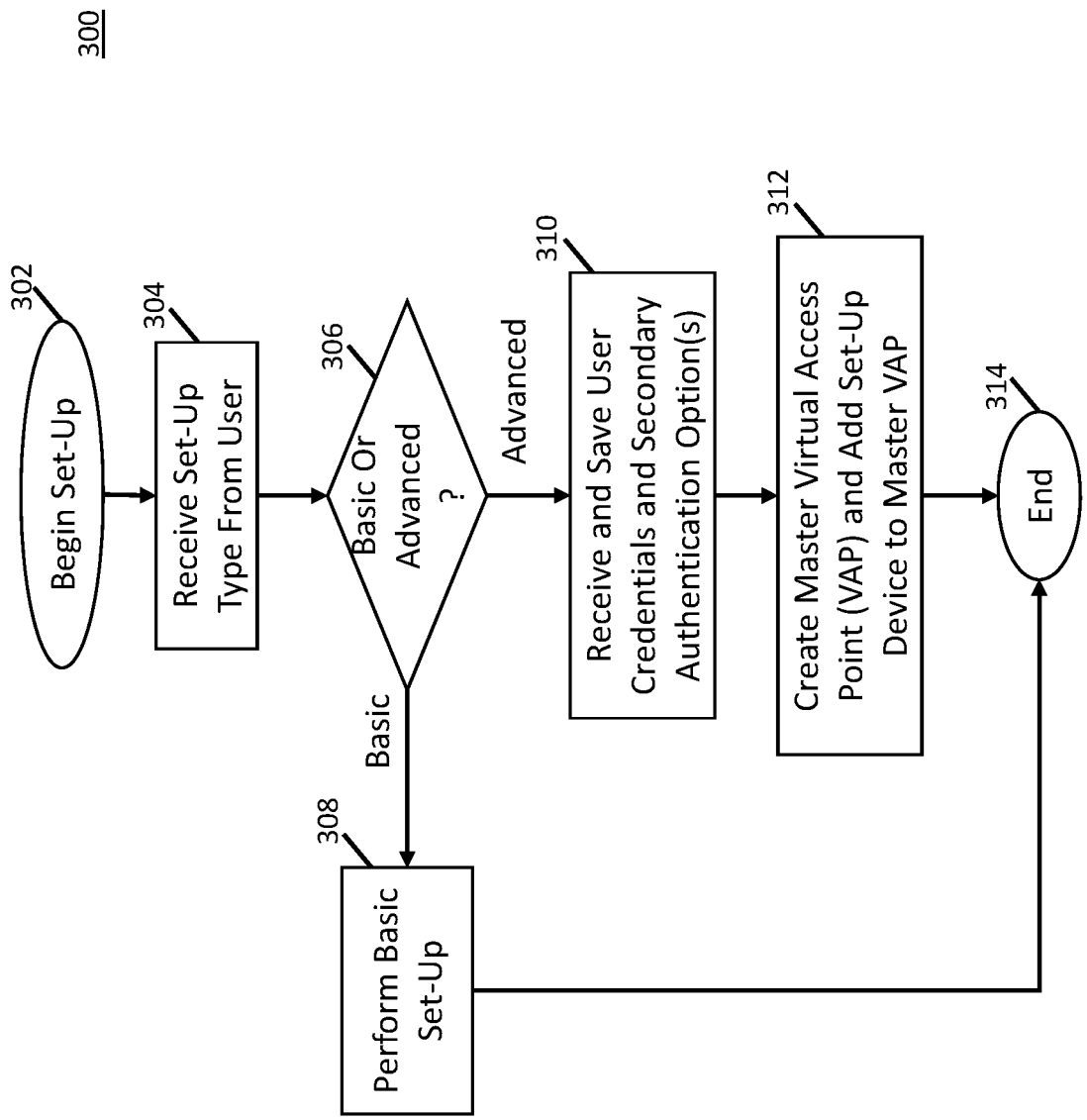
FIG. 3 illustrates an example of a process for setting-up a WiFi router in accordance with some embodiments.

Turning to FIG. 3, an example 300 of a process for setting-up a WiFi router in accordance with some embodiments is illustrated. Process 300 may be executed by any suitable device, such as WiFi router 114 or WiFi router management server 106, in some embodiments.

As shown, after process 300 begins at 302, the process receives, at 304, a set-up type selection from a user of a user device (such as user device 116) being used to setup the WiFi router. Any suitable set-up type can be selected, and the set-up type selection can be received in any suitable manner. For example, in some embodiments, a set-up type can be basic, advanced, or any other suitable value. A basic set-up type can be a set-up not involving virtual access points (VAPs) as described herein, whereas an advanced set-up type can be a set-up involving one or more VAPs as described herein. As another example, the set-up type selection can be received via a user interface presented on the user device and transmitted to a WiFi router, such as user WiFi router 114, or to a WiFi router management server, such as WiFi router management server 106.

In some embodiments, process 300 may be configured to allow a user to interact with process 300 only via mobile app executing on a user mobile device, such as a mobile phone.

At 306, process 300 can next determine the set-up type selection that was received at 304. For example, process 300 can determine whether the set-up type selection that was received was basic or advanced at 306.

If the set-up type selection that was received was basic, process 300 can perform a basic set-up as known in the art at 308. Otherwise, if the set-up type selection that was received was advanced, process 300 can proceed to 310.

At 310, process 300 can receive and save user credentials and one or more secondary authentication (SA) options at 310. After completing process 300, the user credentials and/or SA option(s) may be required to be met after set-up to take subsequent actions as described herein, in some embodiments. Any suitable user credentials can be received in some embodiments. For example, in some embodiments, user credentials can be a user name or id, a password, a biometric input (e.g., fingerprint, face scan, eye scan, voice print, etc.), and/or any other suitable information. Any suitable SA option(s) can be selected, in some embodiments. For example, in some embodiments, SA option(s) can be selected so that, in order to pass SA, a user is required to: enter a code received via a short-message-service (SMS) message (i.e., via text message) at a mobile device (such as user device 116), via computer spoken message via telephone call to a mobile device (such as user device 116), via an e-mail message, etc.; enter a code generated on an authentication device, such as an authenticator application (e.g., GOOGLE AUTHENTICATOR, LASTPASS AUTHENTICATOR, etc.), a security token (e.g., RSA SECURID token, a YUBIKEY, etc.); etc.

Next, at 312, process 300 can create a master virtual access point (VAP) and add the user device (e.g., user device 116) to the master VAP, in some embodiments. A master VAP can be created in any suitable manner and can have any suitable attributes, in some embodiments. For example, devices connected to the master VAP can be connected for an unlimited time period, in some embodiments. As another example, devices connected to the master VAP can disconnect and reconnect to the master VAP any suitable number of times, in some embodiments. As still another, device connected to the master VAP can connect to each other and/or to a wide area network, such as the Internet, in some embodiments. As still another example, the master VAP can have its own SSID and password or share a common SSID and password.

After completing 308 or 312, process 300 can end at 314.

Figure 4:
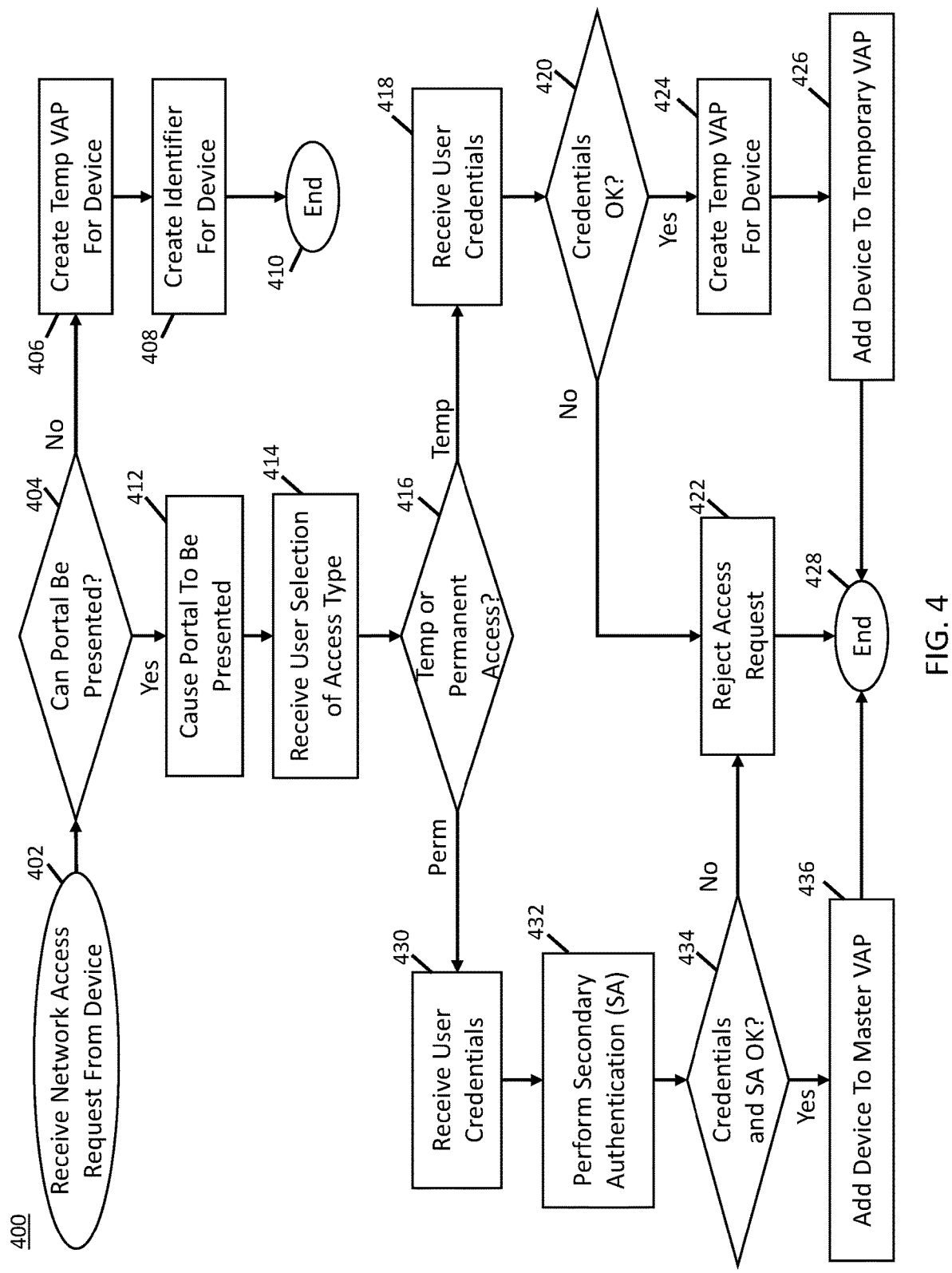
FIG. 4 illustrates an example of a process for responding to a request for network access from a device in accordance with some embodiments.

FIG. 4 illustrates an example 400 of a process for responding to a request for network access from a device in accordance with some embodiments. This request can come from any suitable device (such as device(s) 116, 118, 120, and/or 122) attempting to connect to a WiFi router (such as WiFi router 114). Process 400 may be executed by any suitable device, such as WiFi router 114 or WiFi router management server 106, in some embodiments.

As shown in FIG. 4, a network access request can be received from a device at 402. This request can be received in any suitable manner, such as through a request to connect to a primary service set identifier (SSID) of a WiFi router, in some embodiments. In some embodiments, the request can have any suitable content.

Next, at 404, process 400 can determine whether a portal can be presented to a user of the device making the request. This determination can be made in any suitable manner in some embodiments. For example, in some embodiments, process 400 can determine whether the device making the request can display a graphical user interface and receive input from the user (as may be the case with a smart phone, tablet computer, laptop computer, smart display, etc.). As another example, process 400 can determine whether the device can output audio and capture images or video from the user (as may be the case with an IP camera), in some embodiments. As still another example, process 400 can determine whether the device can output and capture audio from the user (as may be the case with a smart speaker), in some embodiments. Such determinations can be made based upon any suitable information about the device received in the request or by requesting and receiving suitable information from the device in response to the request, in some embodiments.

In some embodiments, even though a portal cannot be presented on the device requesting a connection, it may be possible to present a portal on a second device in communication with the device. For example, in some embodiments, a device such as an Internet of Things (IoT) sensor (such as a motion sensor) may not be able to present a portal, but the device may be in communication with a smart phone that is capable of presenting the portal. In such case, the device can be considered as being capable of presenting the portal even though the portal is actually effected via the second device.

If it is determined at 404 that a portal cannot be presented, then process 400 can branch to 406 at which the process can create a temporary VAP for the device. This temporary VAP can prevent the device from connecting to other devices connected to the WiFi router and can allow the device to access a wide area network, such as the Internet, in some embodiments. This temporary VAP can be configured to expire after a period of time (e.g., such as any suitable number of minutes, hours, days, weeks, or months) in some embodiments. This temporary VAP can have its own SSID and password or share a common SSID and password. Next, at 408, in some embodiments, process 400 can create an identifier for the device so that the device can later be identified by a user if needed. Following 408, process can then end at 410.

If it is determined at 404 that a portal can be presented, then process 400 can branch to 412 at which the process can cause a portal to be presented. This portal can be presented in any suitable manner based on the capabilities of the device. For example, this portal can be presented as a graphical user interface or an audio-only interface. As another example, this portal can receive input using a keypad, a mouse, a touch screen, a microphone, a camera, and/or any other suitable input mechanism.

Next, at 414, process 400 can receive a user selection of a requested access type for the device. Any suitable access type can be requested, and the requested access type can be selected in any suitable manner. For example, in some embodiments, the access type can be requested as being one of temporary or permanent. As another example, the access type can additionally or alternatively be requested as being isolated or non-isolated. The requested access type can be selected using a keypad, a mouse, a touch screen, a microphone, a camera, and/or any other suitable input mechanism based on the device in some embodiments.

At 416, process 400 can determine which access type is requested. For example, as illustrated, process 400 can determine whether temporary or permanent access was requested. In some embodiments, process 400 can also determine whether the user requested other access types such as isolated or non-isolated so that four possible determinations could be made: (1) temporary and isolated; (2) temporary and non-isolated; (3) permanent and isolated; and (4) permanent and non-isolated. Any other suitable determinations can additionally or alternatively be made in some embodiments.

If process 400 determines at 416 that the requested access type is temporary, process 400 can branch to 418 at which it can receive used credentials. The user credentials can be received in any suitable manner based on the capabilities of the device in some embodiments.

Then, at 420, process 400 can determine whether the credentials are OK. Any suitable determination can be made to determine that the credentials are OK. For example, in some embodiments, the credentials can be determined as being OK when a user id and password entered match stored values for the user id and password. As another example, in some embodiments, the credentials can be determined as being OK when a fingerprint entered matches a stored fingerprint.

If the credentials are determined as not being OK at 420, then process 400 can reject the access request at 422 and end at 428. The access request can be rejected at 422 in any suitable manner.

Otherwise, if the credentials are determined as being OK at 420, then process 400 can branch to 424. At 424, the process can create a temporary VAP for the device. This temporary VAP can be created in any suitable manner and can have any suitable properties, in some embodiments. For example, this temporary VAP can be an isolated VAP (meaning that no other device can be connected to by the device while in this VAP) or a non-isolated VAP (meaning that other device(s) can be connected to by the device while in this VAP), in some embodiments. As another example, this temporary VAP can have any suitable duration (e.g., such as any suitable number of minutes, hours, days, weeks, months, etc.), in some embodiments. As still another example, this temporary VAP can have its own SSID and password or share a common SSID and password, in some embodiments.

Then, process 400 can add the device to the temporary VAP in any suitable manner in some embodiments at 426 and end at 428.

Alternatively to creating a new temporary VAP at 424 and adding the device to the created temporary VAP at 426, in some embodiments, the device can be connected to an existing temporary VAP meeting the required properties of the device.

Referring back to 416, if it is determined at 416 that the access requested is permanent, then process 400 can receive user credentials at 430. The user credentials can be received in any suitable manner based on the capabilities of the device in some embodiments.

Next, at 432, process can perform secondary authentication (SA) on the user based on the SA options. The secondary authentication can be performed in any suitable manner in some embodiments. For example, in some embodiment, the secondary authentication can be performed by requiring a user to: enter a code received via a short-message-service (SMS) message (i.e., via text message) at a mobile device (such as user device 116), via computer spoken message via telephone call to a mobile device (such as user device 116), via an e-mail message, etc.; enter a code generated on an authentication device, such as an authenticator application (e.g., GOOGLE AUTHENTICATOR, LASTPASS AUTHENTICATOR, etc.), a security token (e.g., RSA SECURID token, a YUBIKEY, etc.); etc.

Then, at 434, process can determine whether the credentials and SA are OK. Any suitable determination can be made to determine that the credentials are OK. For example, in some embodiments, the credentials can be determined as being OK when a user id and password entered match stored values for the user id and password. As another example, in some embodiments, the credentials can be determined as being OK when a fingerprint entered match a stored fingerprint. Any suitable determination can be made to determine that the SA is OK in some embodiments. For example, in some embodiments, a determination can be made as to whether a code entered for SA matches an expected code.

If the credentials are or the SA is determined as not being OK at 434, then process 400 can reject the access request at 422 and end at 428. The access request can be rejected at 422 in any suitable manner.

Otherwise, if the credentials are and the SA is determined as being OK at 434, then process 400 can add the device to the master VAP (or another permanent VAP) in any suitable manner in some embodiments at 436 and then end at 428.

If process 400 adds the device to another permanent VAP at 436, it may be necessary to first create the permanent VAP for the device. This permanent VAP can be created in any suitable manner and can have any suitable properties. For example, this permanent VAP can be an isolated VAP (meaning that no other device can be connected to by the device while in this VAP) or a non-isolated VAP (meaning that other device(s) can be connected to by the device while in this VAP), in some embodiments. As another example, this permanent VAP can have its own SSID and password or share a common SSID and password.

Figure 5:
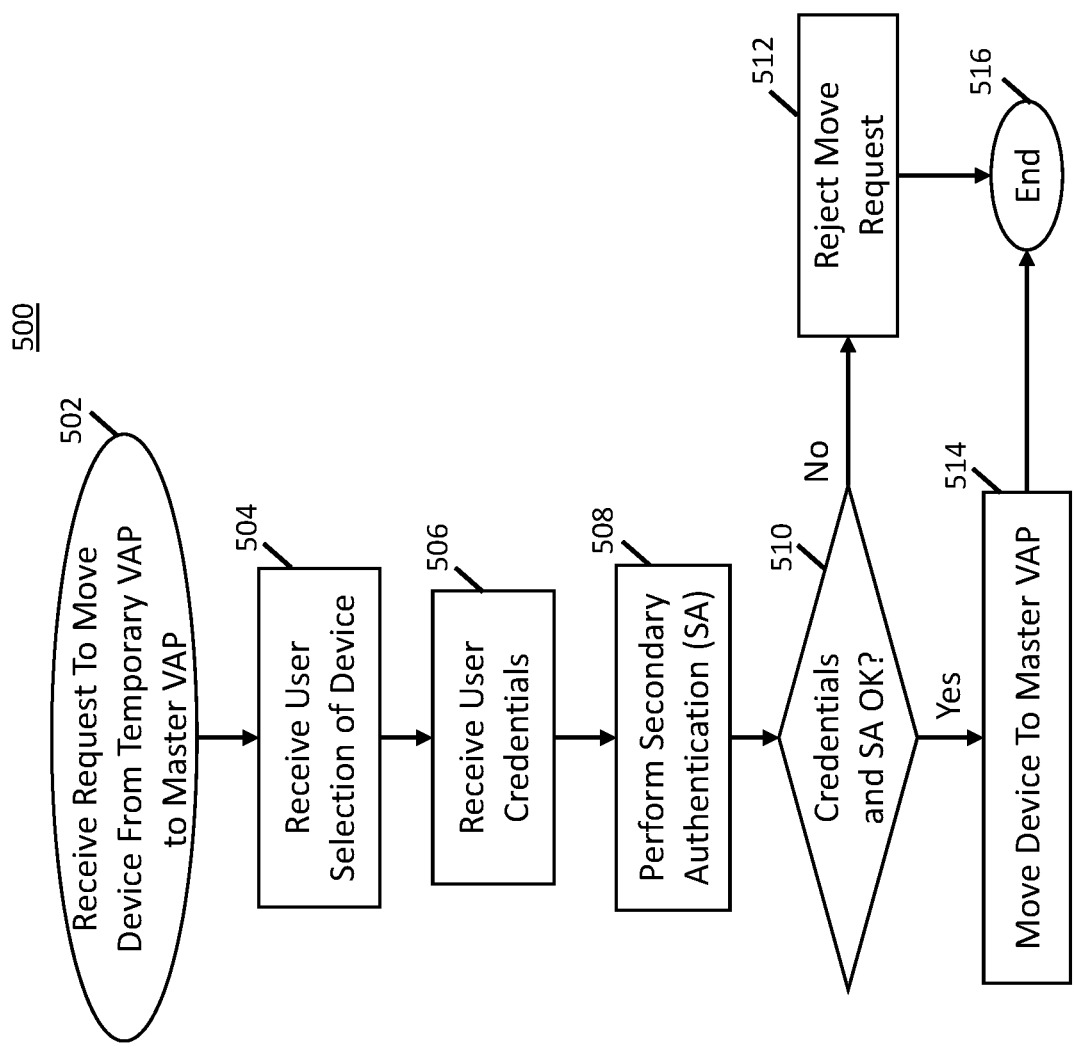
FIG. 5 illustrates an example of a process for responding to a request for move a device from a temporary virtual access point (VAP) to a master VAP in accordance with some embodiments.

Turning to FIG. 5, an example 500 of a process for responding to a request to move a device from a temporary VAP to the master VAP in accordance with some embodiments is shown. This request can come from any suitable device (such as device(s) 116, 118, 120, and/or 122) attempting to move a device from a temporary VAP to a master VAP. Process 500 may be executed by any suitable device, such as WiFi router 114 or WiFi router management server 106, in some embodiments.

At 502, process 500 can begin by receiving a request to move a device from a temporary VAP to a master VAP. This request can be received in any suitable manner in some embodiments. For example, in some embodiments, this request can be made from a menu selection in a set-up application for a WiFi router.

Next at 504, process can receive a user selection of a device to be moved. This can be performed in any suitable manner in some embodiments. For example, in some embodiments, this selection can be made by the user being presented with a list of user identifiers of devices connected to temporary VAPs and by receiving a selection of one of the entries in the list.

Next, at 506, 508, and 510, process 500 can receive user credentials, perform SA, and determine whether the credentials are and the SA is OK. These blocks can be performed in any suitable manner such as described above in connection with blocks 430, 432, and 434 of FIG. 4.

If the credentials are or the SA is determined as not being OK at 510, then process 500 can reject the move request at 512 and end at 516. The move request can be rejected at 512 in any suitable manner.

Otherwise, if the credentials are and the SA is determined as being OK at 510, then process 400 can move the device to the master VAP in any suitable manner in some embodiments at 514 and then end at 516.

It should be understood that at least some of the above described blocks of the processes of FIGS. 3, 4, and 5 can be executed or performed in any order or sequence not limited to the order and sequence shown in and described in the figures. Also, some of the above blocks of the processes of FIGS. 3, 4, and 5 can be executed or performed substantially simultaneously where appropriate or in parallel to reduce latency and processing times. Additionally or alternatively, some of the above described blocks of the processes of FIGS. 3, 4, and 5 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for securing WiFi routers and devices connected to them are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for securing a WiFi router, comprising:
   receiving a first request to form a first connection between a first device and the WiFi router;
   determining whether a first portal can be presented in connection with the first device;
   in response to determining that the first portal cannot be presented in connection with the first device:
      creating a first temporary virtual access point using the WiFi router; and
      connecting the first device to the WiFi router using the first temporary virtual access point;
   receiving a second request to form a second connection between a second device and the WiFi router;
   determining whether a second portal can be presented in connection with the second device; and
   in response to determining that the second portal can be presented in connection with the second device:
      causing the second portal to be presented;
      receiving a first user selection that the second connection is to be temporary;
      receiving second credentials for a second user;
      determining whether the second credentials indicate that the second user is authorized to connect the second device to the WiFi router using a second temporary virtual access point; and
      in response to determining that the second credentials indicate that the second user is authorized to connect the second device to the WiFi router using the second temporary virtual access point:
         connecting the second device to the WiFi router using the second temporary virtual access point.

2. The method of claim 1, further comprising:
   receiving a third request to move the first connection from the first temporary virtual access point to a permanent virtual access point;
   receiving first credentials for the first user;
   performing secondary authentication for the first user;
   determining whether the first credentials and the secondary authentication indicate that the first user is authorized to move the first connection from the first temporary virtual access point to the permanent virtual access point; and
   in response to determining that the first credentials and the secondary authentication indicate that the first user is authorized to move the first connection from the first temporary virtual access point to the permanent virtual access point, moving the first connection from the first temporary virtual access point to the permanent virtual access point.

3. The method of claim 1, further comprising:
receiving a third request to form a third connection between a third device and the WiFi router;
determining whether a third portal can be presented in connection with the third device; and
in response to determining that the third portal can be presented in connection with the third device:
  causing the third portal to be presented;
  receiving a second user selection that the third connection is to be temporary;
  receiving third credentials for a third user;
  determining whether the third credentials indicate that the third user is authorized to connect the third device to the WiFi router using a third temporary virtual access point; and
  in response to determining that the third credentials indicate that the third user is authorized to connect the third device to the WiFi router using the third temporary virtual access point:
    connecting the third device to the WiFi router using the third temporary virtual access point.

4. The method of claim 1, further comprising: creating the second temporary virtual access point using the WiFi router in response to determining that the second credentials indicate that the second user is authorized to connect the second device to the WiFi router using the second temporary virtual access point.

5. The method of claim 1, further comprising disconnecting the first device from the WiFi router using the first temporary virtual access point after a predetermined period since connecting the first device to the WiFi router using the first temporary virtual access point.

6. A method for securing a WiFi router, comprising:
receiving a first request to form a first connection between a first device and the WiFi router;
determining whether a first portal can be presented in connection with the first device;
in response to determining that the first portal cannot be presented in connection with the first device:
  creating a first temporary virtual access point using the WiFi router; and
  connecting the first device to the WiFi router using the first temporary virtual access point;
receiving a second request to form a second connection between a second device and the WiFi router;
determining whether a second portal can be presented in connection with the second device; and
in response to determining that the second portal can be presented in connection with the second device:
  causing the second portal to be presented;
  receiving a first user selection that the second connection is to be permanent;
  receiving second credentials for a second user;
  determining whether the second credentials indicate that the second user is authorized to connect the second device to the WiFi router using a first permanent virtual access point; and
  in response to determining that the second credentials indicate that the second user is authorized to connect the second device to the WiFi router using the first permanent virtual access point:
    connecting the second device to the WiFi router using the first permanent virtual access point.

7. The method of claim 6, further comprising: creating the first permanent virtual access point using the WiFi router in response to determining that the second credentials indicate that the second user is authorized to connect the second device to the WiFi router using the first permanent virtual access point.

8. The method of claim 6, further comprising:
receiving a third request to move the first connection from the first temporary virtual access point to a permanent virtual access point;
receiving first credentials for a first user;
performing secondary authentication for the first user;
determining whether the first credentials and the secondary authentication indicate that the first user is authorized to move the first connection from the first temporary virtual access point to the permanent virtual access point; and
in response to determining that the first credentials and the secondary authentication indicate that the first user is authorized to move the first connection from the first temporary virtual access point to the permanent virtual access point, moving the first connection from the first temporary virtual access point to the permanent virtual access point.

9. A system for securing a WiFi router, comprising:
a memory; and
a hardware processor coupled to the memory and configured to:
  receive a first request to form a first connection between a first device and the WiFi router;
  determine whether a first portal can be presented in connection with the first device;
  in response to determining that the first portal cannot be presented in connection with the first device:
    create a first temporary virtual access point using the WiFi router; and
    connect the first device to the WiFi router using the first temporary virtual access point;
  receive a second request to form a second connection between a second device and the WiFi router;
  determine whether a second portal can be presented in connection with the second device; and
  in response to determining that the second portal can be presented in connection with the second device:
    cause the second portal to be presented;
    receive a first user selection that the second connection is to be permanent;
    receive second credentials for a second user;
    determine whether the second credentials indicate that the second user is authorized to connect the second device to the WiFi router using a first permanent virtual access point; and
    in response to determining that the second credentials indicate that the second user is authorized to connect the second device to the WiFi router using the first permanent virtual access point:
      connect the second device to the WiFi router using the first permanent virtual access point.

10. The system of claim 9, wherein the hardware processor is also configured to: create the first permanent virtual access point using the WiFi router in response to determining that the second credentials indicate that the second user is authorized to connect the second device to the WiFi router using the first permanent virtual access point.

11. The system of claim 9, wherein the hardware processor is also configured to:
receive a third request to move the first connection from the first temporary virtual access point to a permanent virtual access point;
receive first credentials for the first user;
perform secondary authentication for the first user;
determine whether the first credentials and the secondary authentication indicate that the first user is authorized to move the first connection from the first temporary virtual access point to the permanent virtual access point; and
in response to determining that the first credentials and the secondary authentication indicate that the first user is authorized to move the first connection from the first temporary virtual access point to the permanent virtual access point, move the first connection from the first temporary virtual access point to the permanent virtual access point.

12. A non-transitory computer-readable medium containing computer executable instructions that, when executed by a processor, cause the processor to perform a method for securing a WiFi router, the method comprising:
receiving a first request to form a first connection between a first device and the WiFi router;
determining whether a first portal can be presented in connection with the first device;
in response to determining that the first portal cannot be presented in connection with the first device:
creating a first temporary virtual access point using the WiFi router; and
connecting the first device to the WiFi router using the first temporary virtual access point;
receiving a second request to form a second connection between a second device and the WiFi router;
determining whether a second portal can be presented in connection with the second device; and
in response to determining that the second portal can be presented in connection with the second device:
causing the second portal to be presented;
receiving a first user selection that the second connection is to be temporary;
receiving second credentials for a second user;
determining whether the second credentials indicate that the second user is authorized to connect the second device to the WiFi router using a second temporary virtual access point; and
in response to determining that the second credentials indicate that the second user is authorized to connect the second device to the WiFi router using the second temporary virtual access point:
connecting the second device to the WiFi router using the second temporary virtual access point.

13. The non-transitory computer-readable medium of claim 12, wherein the method further comprises:
receiving a third request to move the first connection from the first temporary virtual access point to a permanent virtual access point;
receiving first credentials for the first user;
performing secondary authentication for the first user;
determining whether the first credentials and the secondary authentication indicate that the first user is authorized to move the first connection from the first temporary virtual access point to the permanent virtual access point; and
in response to determining that the first credentials and the secondary authentication indicate that the first user is authorized to move the first connection from the first temporary virtual access point to the permanent virtual access point, moving the first connection from the first temporary virtual access point to the permanent virtual access point.

14. A non-transitory computer-readable medium containing computer executable instructions that, when executed by a processor, cause the processor to perform a method for securing a WiFi router, the method comprising:
receiving a first request to form a first connection between a first device and the WiFi router;
determining whether a first portal can be presented in connection with the first device;
in response to determining that the first portal cannot be presented in connection with the first device:
creating a first temporary virtual access point using the WiFi router; and
connecting the first device to the WiFi router using the first temporary virtual access point;
receiving a second request to form a second connection between a second device and the WiFi router;
determining whether a second portal can be presented in connection with the second device; and
in response to determining that the second portal can be presented in connection with the second device:
causing the second portal to be presented;
receiving a first user selection that the second connection is to be permanent;
receiving second credentials for a second user;
determining whether the second credentials indicate that the second user is authorized to connect the second device to the WiFi router using a first permanent virtual access point; and
in response to determining that the second credentials indicate that the second user is authorized to connect the second device to the WiFi router using the first permanent virtual access point:
connecting the second device to the WiFi router using the first permanent virtual access point.

15. The non-transitory computer-readable medium of claim 14, wherein the method further comprises:
receiving a third request to move the first connection from the first temporary virtual access point to a permanent virtual access point;
receiving first credentials for the first user;
performing secondary authentication for the first user;
determining whether the first credentials and the secondary authentication indicate that the first user is authorized to move the first connection from the first temporary virtual access point to the permanent virtual access point; and
in response to determining that the first credentials and the secondary authentication indicate that the first user is authorized to move the first connection from the first temporary virtual access point to the permanent virtual access point, moving the first connection from the first temporary virtual access point to the permanent virtual access point.

16. A system for securing a WiFi router, comprising:
a memory; and
a hardware processor coupled to the memory and configured to:
receive a first request to form a first connection between a first device and the WiFi router;
determine whether a first portal can be presented in connection with the first device;

in response to determining that the first portal cannot be presented in connection with the first device:
create a first temporary virtual access point using the WiFi router; and
connect the first device to the WiFi router using the first temporary virtual access point;
receive a second request to form a second connection between a second device and the WiFi router;
determine whether a second portal can be presented in connection with the second device; and
in response to determining that the second portal can be presented in connection with the second device:
cause the second portal to be presented;
receive a first user selection that the second connection is to be temporary;
receive second credentials for a second user;
determine whether the second credentials indicate that the second user is authorized to connect the second device to the WiFi router using a second temporary virtual access point; and
in response to determining that the second credentials indicate that the second user is authorized to connect the second device to the WiFi router using the second temporary virtual access point:
connect the second device to the WiFi router using the second temporary virtual access point.

17. The system of claim 16, wherein the hardware processor is also configured to:
receive a third request to move the first connection from the first temporary virtual access point to a permanent virtual access point;
receive first credentials for the first user;
perform secondary authentication for the first user;
determine whether the first credentials and the secondary authentication indicate that the first user is authorized to move the first connection from the first temporary virtual access point to the permanent virtual access point; and
in response to determining that the first credentials and the secondary authentication indicate that the first user is authorized to move the first connection from the first temporary virtual access point to the permanent virtual access point, move the first connection from the first temporary virtual access point to the permanent virtual access point.

18. The system of claim 16, wherein the hardware processor is also configured to: create the second temporary virtual access point using the WiFi router in response to determining that the second credentials indicate that the second user is authorized to connect the second device to the WiFi router using the second temporary virtual access point.

19. The system of claim 16, wherein the hardware processor is also configured to:
receive a third request to form a third connection between a third device and the WiFi router;
determine whether a third portal can be presented in connection with the third device; and
in response to determining that the third portal can be presented in connection with the third device:
cause the third portal to be presented;
receive a second user selection that the third connection is to be temporary;
receive third credentials for a third user;
determine whether the third credentials indicate that the third user is authorized to connect the third device to the WiFi router using a third temporary virtual access point; and
in response to determining that the third credentials indicate that the third user is authorized to connect the third device to the WiFi router using the third temporary virtual access point:
connect the third device to the WiFi router using the third temporary virtual access point.

20. The system of claim 16 wherein the hardware processor is also configured to disconnect the first device from the WiFi router using the first temporary virtual access point after a predetermined period since connecting the first device to the WiFi router using the first temporary virtual access point.

* * * * *